United States Patent
Chiang et al.

(10) Patent No.: US 11,397,471 B2
(45) Date of Patent: Jul. 26, 2022

(54) ACTION EVALUATION MODEL BUILDING APPARATUS AND ACTION EVALUATION MODEL BUILDING METHOD THEREOF

(71) Applicant: Institute For Information Industry, Taipei (TW)

(72) Inventors: Chen-Kuo Chiang, Chiayi County (TW); Yun-Zhong Lu, Hualien County (TW); Bo-Nian Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 1269 days.

(21) Appl. No.: 15/831,387

(22) Filed: Dec. 4, 2017

(65) Prior Publication Data
US 2019/0146590 A1 May 16, 2019

(30) Foreign Application Priority Data
Nov. 15, 2017 (TW) ................................ 106139489

(51) Int. Cl.
*G06F 3/01* (2006.01)
*G06K 9/62* (2022.01)
(Continued)

(52) U.S. Cl.
CPC ............ *G06F 3/017* (2013.01); *G06K 9/6278* (2013.01); *G06N 3/02* (2013.01); *G06N 20/00* (2019.01); *G06V 40/23* (2022.01)

(58) Field of Classification Search
CPC ...... G06F 3/017; G06K 9/6278; G06K 9/627; G06N 3/02; G06N 20/00; G06N 3/08;
(Continued)

(56) References Cited

U.S. PATENT DOCUMENTS 8,345,984 B2 1/2013 Ji et al.
2019/0146759 A1* 5/2019 Chiang .................. G06N 5/003
717/104

FOREIGN PATENT DOCUMENTS

CN 106446844 A 2/2017
CN 106991372 A 7/2017

OTHER PUBLICATIONS

Office Action to the corresponding Taiwan Patent Application No. 106139489 rendered by the Taiwan Intellectual Property Office (TIPO) dated Jul. 5, 2018, 11 pages (including English translation).

* cited by examiner

*Primary Examiner* — Abhishek Sarma
(74) *Attorney, Agent, or Firm* — Li & Cai Intellectual Property Office

(57) ABSTRACT

An action evaluation model building apparatus and an action evaluation model building method thereof are provided. The action evaluation model building apparatus stores a plurality of raw data sets and a plurality of standard action labels corresponding thereto. Based on machine learning algorithms, the action evaluation model building apparatus computes the raw data sets and performs a supervised learning to build a feature vector creation model and a classifier model. The action evaluation model building apparatus determines a representation action feature vector of each standard action label by randomly generating a plurality of action feature vectors and inputting them into the classifier model. The action evaluation model building apparatus builds an action evaluation model based on the feature vector creation model, the classifier model and the representation action feature vectors.

16 Claims, 7 Drawing Sheets

(51) Int. Cl.
*G06N 3/02* (2006.01)
*G06N 20/00* (2019.01)
*G06V 40/20* (2022.01)

(58) Field of Classification Search
CPC ........ G06N 5/003; G06N 7/005; G06N 20/10; G06N 3/0445; G06N 3/0454; G06N 20/20; G06V 40/23; G06V 10/454; G06V 10/82; G06V 20/46; G06V 20/44
See application file for complete search history.

ACTION EVALUATION MODEL BUILDING APPARATUS AND ACTION EVALUATION MODEL BUILDING METHOD THEREOF

PRIORITY

This application claims priority to Taiwan Patent Application No. 106139489 filed on Nov. 15, 2017, which is hereby incorporated by reference in its entirety.

FIELD

The present invention relates to an action evaluation model building apparatus and an action evaluation model building method thereof. More particularly, the action evaluation model building apparatus of the present invention builds an action evaluation model by machine learning algorithms.

BACKGROUND

With the rapid development of science and technologies, smart phones and various wearable devices are ubiquitous in people's daily life, and brings different applications (e.g., in video games or sport activities). For example, most of current wearable devices have motion sensors (e.g., gravity sensors) mounted therein, so the wearable devices may identify actions of users to perform corresponding operations. However, current identification technologies can only provide action classification and cannot provide action classification and action scoring at the same time, so the actual application thereof is limited.

Accordingly, an urgent need exists in the art to build an action evaluation model for use in a wearable device so as to provide action classification and action scoring at the same time.

SUMMARY

An objective of the present invention, according to certain embodiments, is to provide an action evaluation model for use in a wearable device, and the action evaluation model is built by a supervised learning based on machine learning algorithms so as to effectively provide the functions of action classification and action scoring at the same time.

The disclosure includes an action evaluation model building apparatus which comprises a storage and a processor. The storage is configured to store a plurality of raw data sets and a plurality of standard action labels. Each of the raw data sets comprises a plurality of raw data, and each of the raw data is generated by a sensing device. Each of the raw data sets corresponds to one of the standard action labels. The processor is electrically connected to the storage and is configured to execute the following operations: computing the raw data of each of the raw data sets based on a first-stage machine learning algorithm to generate a plurality of standard action feature vectors; computing the standard action feature vectors based on a second-stage machine learning algorithm to generate a plurality of standard action classification vectors; performing a supervised learning of the first-stage machine learning algorithm and the second-stage machine learning algorithm based on the raw data sets and the standard action labels corresponding to the raw data sets to build a feature vector creation model and a classifier model, wherein the supervised learning makes the standard action classification vectors, each of which is generated by inputting the raw data of the raw data set corresponding to each of the standard action labels into the feature vector creation model and the classifier model, have a specific component value; generating a plurality of action classification vectors by randomly generating a plurality of action feature vectors and inputting the action feature vectors into the classifier model; selecting a representation action feature vector corresponding to each of the standard action labels from the action feature vectors according to the action classification vectors, the action classification vector corresponding to each of the representation action feature vectors having a relative component maximal value; and building an action evaluation model based on the feature vector creation model, the classifier model and the representation action feature vectors corresponding to the standard action labels.

The disclosure also includes an action evaluation model building method for an action evaluation model building apparatus. The action evaluation model building apparatus comprises a storage and a processor. The storage is configured to store a plurality of raw data sets and a plurality of standard action labels. Each of the raw data sets comprises a plurality of raw data, and each of the raw data is generated by a sensing device. Each of the raw data sets corresponds to one of the standard action labels. The action evaluation model building method is executed by the processor and comprises the following steps: computing the raw data of each of the raw data sets based on a first-stage machine learning algorithm to generate a plurality of standard action feature vectors; computing the standard action feature vectors based on a second-stage machine learning algorithm to generate a plurality of standard action classification vectors; performing a supervised learning of the first-stage machine learning algorithm and the second-stage machine learning algorithm based on the raw data sets and the standard action labels corresponding to the raw data sets to build a feature vector creation model and a classifier model, wherein the supervised learning makes the standard action classification vectors, each of which is generated by inputting the raw data of the raw data set corresponding to each of the standard action labels into the feature vector creation model and the classifier model, have a specific component value; generating a plurality of action classification vectors by randomly generating a plurality of action feature vectors and inputting the action feature vectors into the classifier model; selecting a representation action feature vector corresponding to each of the standard action labels from the action feature vectors according to the action classification vectors, the action classification vector corresponding to each of the representation action feature vectors having a relative component maximal value; and building an action evaluation model based on the feature vector creation model, the classifier model and the representation action feature vectors corresponding to the standard action labels.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular examples, embodiments, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
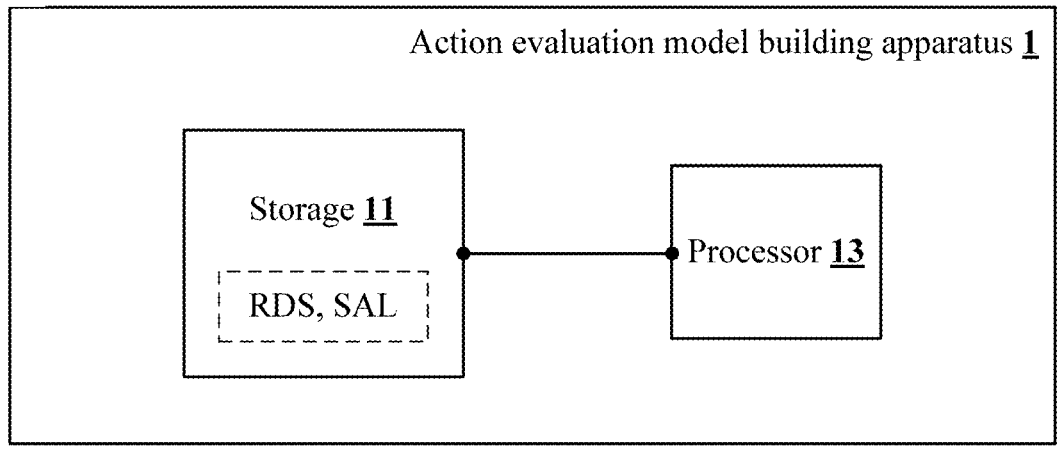
FIG. 1A is a schematic view depicting an action evaluation model building apparatus 1 of the present invention.
Figure 2A:
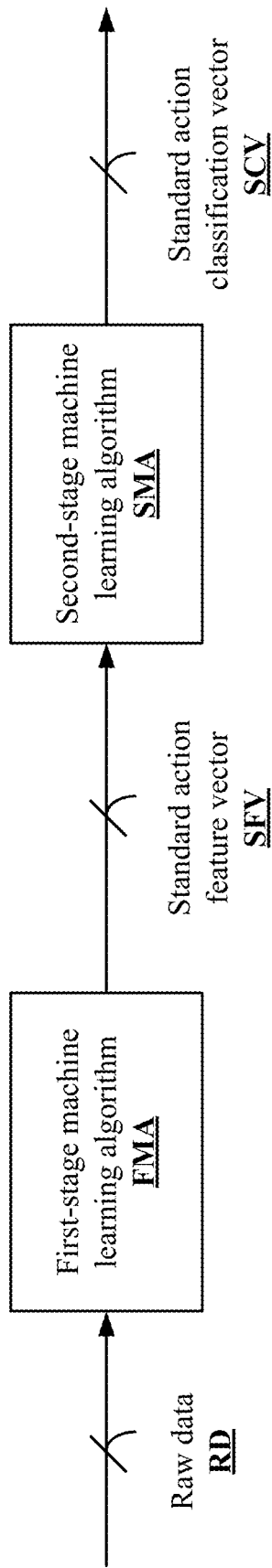
FIG. 2A is a schematic view depicting the action evaluation model building apparatus 1 of the present invention performing model training.
Figure 2B:
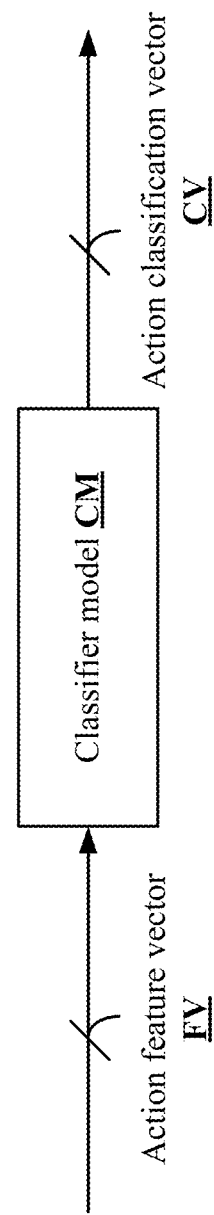
FIG. 2B is a schematic view depicting the action evaluation model building apparatus 1 of the present invention determining a representation action feature vector corresponding to each of the standard action labels.
Figure 3:
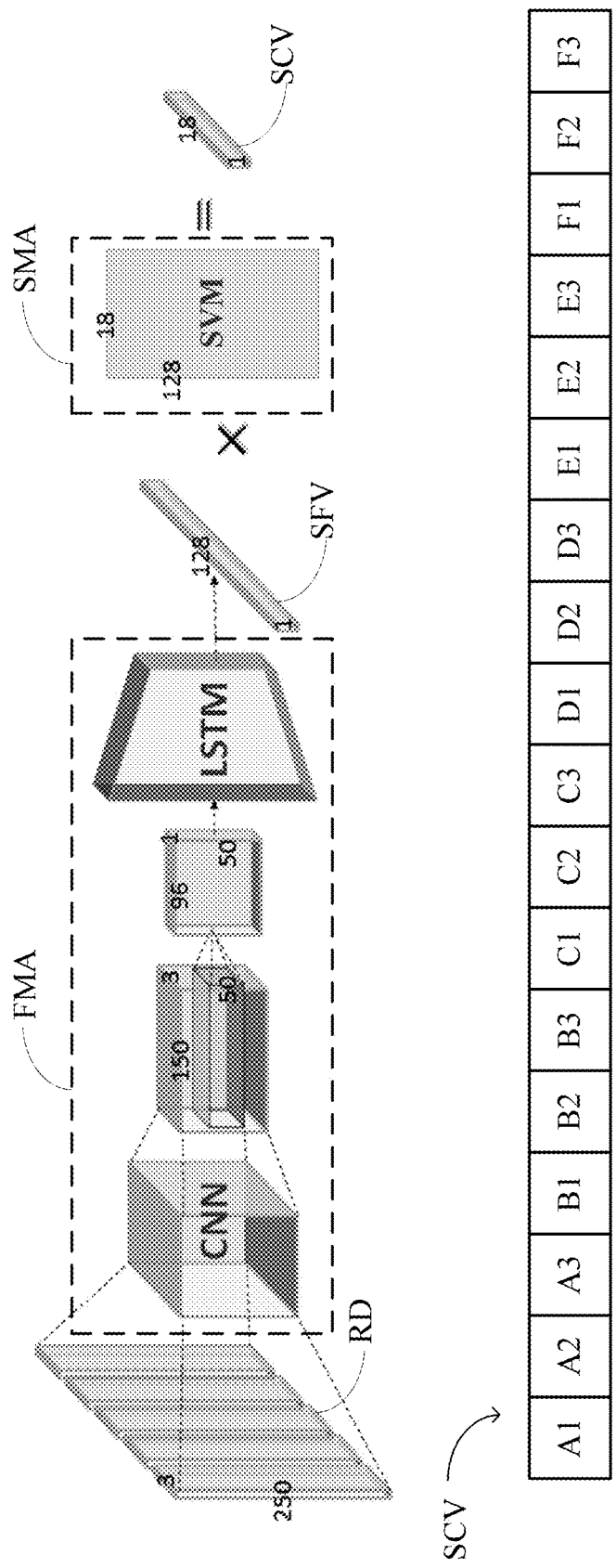
FIG. 3 is a schematic view depicting the action evaluation model building apparatus 1 of the present invention performing model training.

Please refer to FIG. 1 to FIG. 3 for a first embodiment of the present invention. FIG. 1 is a schematic view depicting an action evaluation model building apparatus 1 of the present invention. The action evaluation model building apparatus 1 comprises a storage 11 and a processor 13. The action evaluation model building apparatus 1 may be a cloud server, a personal computer or any apparatus having computational and processing capability. The processor 13 is electrically connected to the storage 11. The storage 11 is configured to store a plurality of raw data sets RDS and a plurality of standard action labels SAL. Each of the raw data sets RDS comprises a plurality of raw data RD, and each of the raw data RD is generated by a sensing device (e.g., a motion sensor mounted into a wearable device). Each of the raw data sets RDS corresponds to one of the standard action labels SAL. In other words, each of the raw data RD is generated in response to an action sensed by a sensing device and corresponds to one of the standard action labels SAL.

FIG. 2A is a schematic view depicting the action evaluation model building apparatus 1 of the present invention performing model training. The processor 13 computes the raw data RD of each of the raw data sets RDS based on a first-stage machine learning algorithm FMA to generate a plurality of standard action feature vectors SFV. For example, the first-stage machine learning algorithm FMA comprises a Convolutional Neural Network (CNN) algorithm and a Long Short-Term Memory (LSTM) algorithm. The CNN algorithm may be used to retrieve features of time sequences of each of the raw data RD, and the LSTM algorithm may be configured to memorize values of indefinite time lengths and determine whether the inputted data is important and needs to be recorded and outputted so as to strengthen the overall neural network of the first-stage machine learning algorithm FMA. After generating the standard action feature vectors SFV, the processor 13 further computes the standard action feature vectors SFV to generate a plurality of standard action classification vectors SCV based on a second-stage machine learning algorithm SMA (e.g., a Support Vector Machine (SVM) algorithm, a Neural Network (NN) algorithm, a Decision Tree (DT) algorithm, a Random Tree (RT) algorithm, a Boosting algorithm, a Bayes algorithm, an Expectation-Maximization (EM) algorithm or a K-Nearest Neighbors (KNN) algorithm).

As shown in FIG. 3, it is assumed that each of the raw data RD is represented by a matrix form of a size of 3*250. A corresponding standard action feature vector SFV of a size of 128*1 will be generated after each of the raw data RD is computed by the first-stage machine learning algorithm FMA (e.g., the combination of the CNN algorithm and the LSTM algorithm), and a corresponding standard action classification vector SCV of a size of 18*1 will be generated after the standard action feature vector SFV is computed by the second-stage machine learning algorithm SMA (e.g., the SVM algorithm). Components A1, A2, A3, B1, B2, B3, C1, C2, C3, D1, D2, D3, E1, E2, E3, F1, F2 and F3 of each of the standard action classification vectors SCV respectively correspond to actions A, B, C, D, E, F and score levels thereof. For example, the components A1, A2 and A3 respectively represent three levels (good, normal, poor) of the action A, the components B1, B2 and B3 respectively represent three levels (good, normal, poor) of the action B, and so on. In other words, each of the standard action classification vectors SCV has a plurality of component values, and each of the component values is associated with one of the standard action labels and represents a score level.

Next, the processor 13 further performs a supervised learning of the first-stage machine learning algorithm FMA and the second-stage machine learning algorithm SMA based on the raw data RD and the standard action labels SAL corresponding to the raw data RD to build a feature vector creation model FVM and a classifier model CM. The supervised learning makes the standard action classification vectors SCV, each of which is generated by inputting the raw data RD of the raw data set RDS corresponding to each of the standard action labels SAL into the feature vector creation model FVM and the classifier model CM, have a specific component value.

For example, the storage 11 stores six standard action labels SAL corresponding to the raw data RD, and the six standard action labels SAL respectively correspond to the actions A, B, C, D, E and F. In other words, each of the raw data RD corresponds to one of the actions A, B, C, D, E and F. The training objective of the aforesaid supervised learning is to: make the component A1 of the standard action classification vector SCV generated from the raw data RD corresponding to the action A have a specific component value (e.g., a specific component value of 1 after being standardized), while an obvious difference (e.g., a difference greater than 30%) exists between the component values of the remaining components A2, A3, B1, B2, B3, C1, C2, C3, D1, D2, D3, E1, E2, E3, F1, F2 and F3 and the component value of the component A1 (i.e., the component values of the remaining components are less than 0.7); make the component B1 of the standard action classification vector SCV generated from the raw data RD corresponding to the action B have a specific component value (e.g., a specific component value of 1 after being standardized), while an obvious difference (e.g., a difference greater than 30%) exists between the component values of the remaining components A1, A2, A3, B2, B3, C1, C2, C3, D1, D2, D3, E1, E2, E3, F1, F2 and F3 and the component value of the component B1 (i.e., the component values of the remaining components are less than 0.7);

and so on. As shall be appreciated by those of ordinary skill in the art, the aforesaid training objective of the machine learning algorithms may be achieved by setting objective functions, and thus will not be further described herein.

Through the training of the aforesaid supervised learning, the processor 13 can obtain neural network parameters required by the first-stage machine learning algorithm FMA and accordingly build a feature vector creation model FVM. Similarly, through the training of the aforesaid supervised learning, the processor 13 can obtain neural network parameters required by the second-stage machine learning algorithm SMA and accordingly build a classifier model CM. How to obtain the neural network parameters required by the machine learning algorithms and accordingly build the models through the training of the supervised learning shall be appreciated by those of ordinary skill in the art based on the above descriptions, and thus will not be further described herein.

After building the feature vector creation model FVM and the classifier model CM, the processor 13 generates a plurality of action classification vectors CV by randomly generating a plurality of action feature vectors FV and inputting the action feature vectors FV into the classifier model CM, as shown in FIG. 2B. Similarly, each of the action classification vectors CV also has components A1, A2, A3, B1, B2, B3, C1, C2, C3, D1, D2, D3, E1, E2, E3, F1, F2 and F3 which respectively correspond to actions A, B, C, D, E, F and score levels thereof. Next, the processor 13 selects a representation action feature vector corresponding to each of the standard action labels SAL from the action feature vectors FV according to the action classification vectors CV, and the action classification vector CV corresponding to each of the representation action feature vectors has a relative component maximal value.

In detail, taking the case of selecting the representation action feature vector corresponding to the standard action label SAL of the action A as an example, the processor 13 selects an action feature vector from the action feature vectors FV, and the action classification vector CV corresponding to the selected action feature vector satisfies a condition that the component value of the component A1 is much larger than the component values of the remaining components A2, A3, B1, B2, B3, C1, C2, C3, D1, D2, D3, E1, E2, E3, F1, F2 and F3 (e.g., based on an objective function). Therefore, the processor 13 may determine the representation action feature vector corresponding to each of the actions A, B, C, D, E and F from the action feature vectors FV. Finally, the processor 13 builds an action evaluation model based on the feature vector creation model FVM, the classifier model CM and the representation action feature vectors corresponding to the standard action labels SAL.

For example, the aforesaid objective function may be represented as the following equation:

$$Obj(CV) = \sum_{j=1}^{c*e} CP_k - CP_j, k = e*i - e + 1, \text{ and } i = 1 \sim c$$

where CV represents the action classification vector, C represents the number of actions (e.g., if there are six actions A, B, C, D, E and F, then c=6), e represents the number of score levels (e.g., if there are three score levels, then e=3), $CP_x$ represents the $x^{th}$ component value of the action classification vector (e.g., $CP_1$ is the component value of the component A1, $CP_4$ is the component value of the component B1). Therefore, taking the action A (i.e., the $i^{th}$ action, i=1) as an example, the processor 13 may select an action classification vector CV of which a sum of values obtained by subtracting $CP_2$ to $CP_{18}$ respectively from the $CP_1$ is the largest (i.e., the largest value of the objective function value is) from the action classification vectors CV based on the objective function, and the action feature vector FV corresponding to the selected action classification vector CV is the representation action feature vector.

It shall be appreciated that, in this embodiment, a combination of the CNN algorithm and the LSTM algorithm is taken as an example of the first-stage machine learning algorithm FMA, and the SVM algorithm is taken as an example of the second-stage machine learning algorithm SMA. However, in other embodiments, other machine learning algorithms capable of generating the standard action feature vectors SFV may also be applied to the first-stage machine learning algorithm FMA of the present invention, and other machine learning algorithms capable of generating the standard action classification vectors SCV may also be applied to the second-stage machine learning algorithm SMA of the present invention.

Figure 1B:
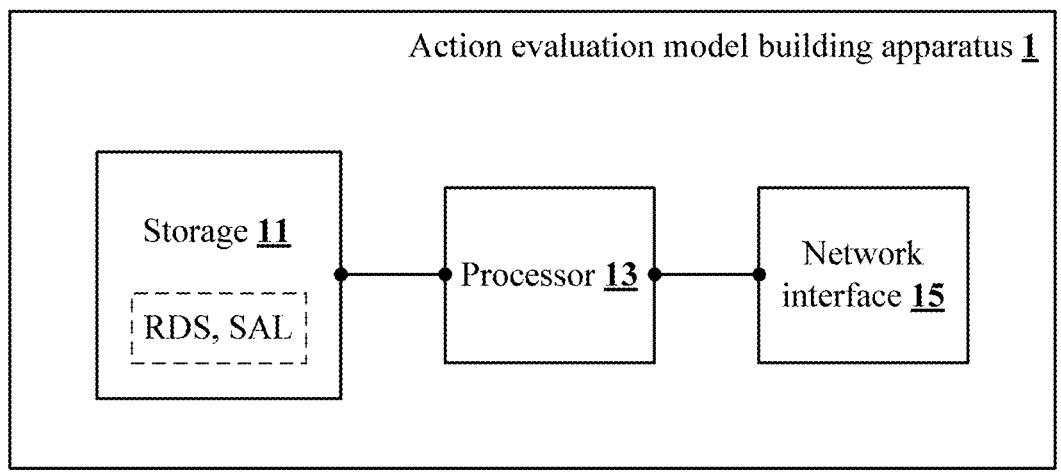
FIG. 1B is another schematic view depicting the action evaluation model building apparatus 1 of the present invention.

Moreover, in other embodiments as shown in FIG. 1B, when the action evaluation model building apparatus 1 is a cloud server, the action evaluation model building apparatus 1 further comprises a network interface 15 which is connected to a network and is configured to receive the raw data sets RDS and the standard action labels SAL from an external apparatus. Here the network interface 15 may be a wired network interface, a wireless network interface or a combination thereof, and the network may be a mobile communication network, the Internet, a local area network or the like, or a combination of the aforesaid networks. The external apparatus may be a personal computer, a mobile phone, a wearable device or any apparatus capable of communication. Additionally, the processor 13 may generate a software development kit (SDK) for an external apparatus to download based on the action evaluation model.

For example, when the user is a sport coach, he/she may use a motion sensor mounted in a wearable device (e.g., a smart wristband) to generate a plurality of raw data RD for different standard sport actions by himself/herself, and label the standard sport actions corresponding to the raw data RD to generate the corresponding standard action labels SAL. Thereafter, the sport coach may upload the raw data RD and the standard action labels SAL to the action evaluation model building apparatus 1 of the present invention so that the action evaluation model building apparatus 1 builds an action evaluation model in response to the reception of the raw data RD and the standard action labels SAL, and generates an SDK for download. Therefore, the sport coach may provide the SDK to a student thereof and the student installs the SDK to his/her wearable device, thereby evaluating actions of the student when the student is doing sport.

Moreover, the SDK may also be installed on a smart phone, a tablet computer, a personal computer or any apparatus that is capable of reading the raw data generated by the motion sensor from the wearable device, thereby evaluating corresponding actions based on the raw data being read. Moreover, the action evaluation model building apparatus 1 of the present invention may also directly provide the service of cloud action evaluation. The action evaluation model building apparatus 1 may receive the raw data generated by the motion sensor from an external apparatus, and evaluate actions corresponding to the raw data using the action evaluation model based on the received raw data. In other words, action identification and evaluation of the action evaluation model of the present invention may be implemented on a cloud server of a provider or an apparatus (e.g., a smart phone, a tablet computer, a personal computer, a wearable device or the like) at the user side.

Figure 4:
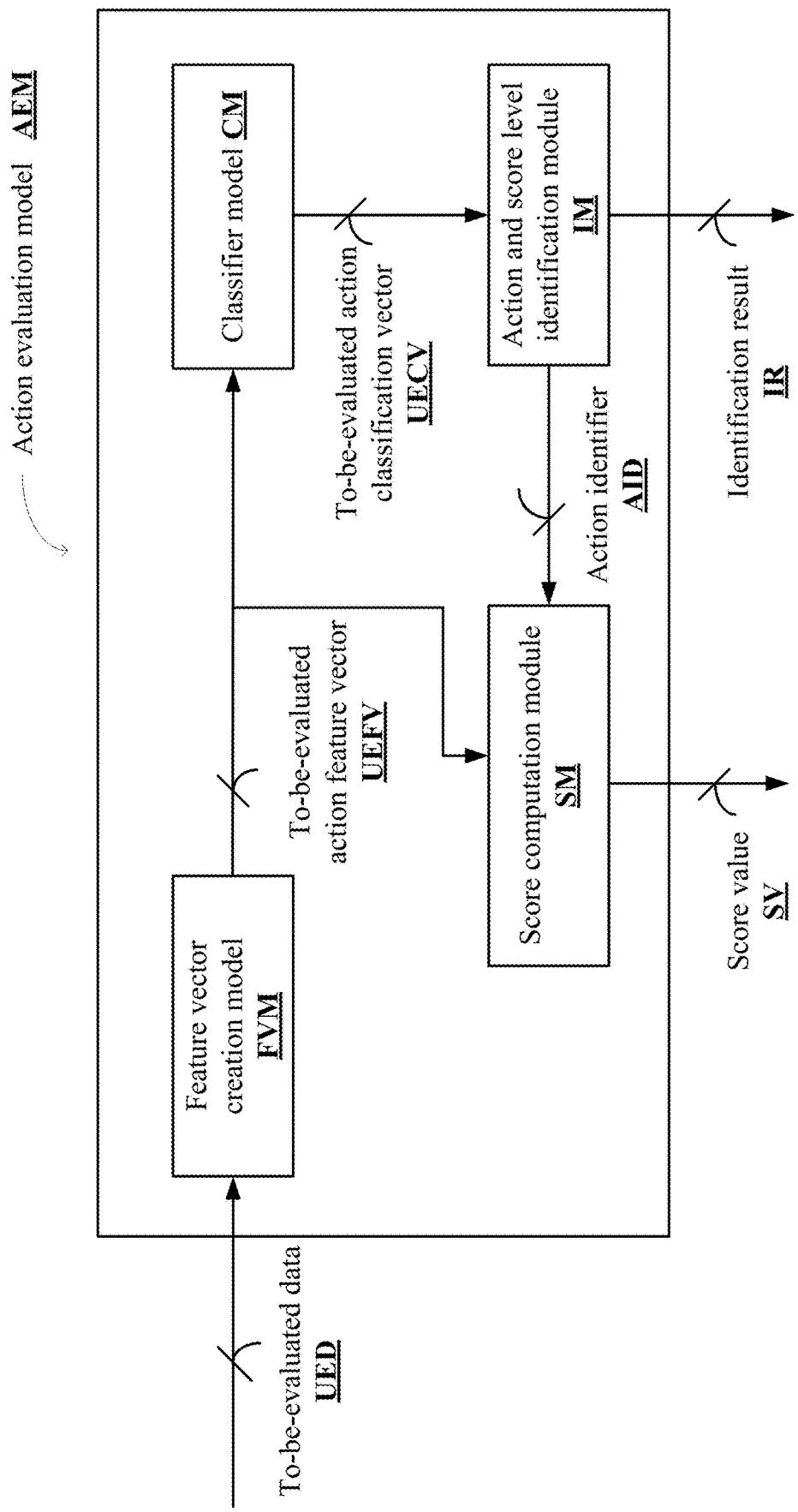
FIG. 4 is a schematic view depicting action evaluation performed by an action evaluation model that is built by the action evaluation model building apparatus 1 of the present invention.

A second embodiment of the present invention is as shown in FIG. 4, which is a schematic view depicting action evaluation performed by an action evaluation model AEM that is built by the action evaluation model building apparatus 1 of the present invention. The second embodiment is a further extension of the first embodiment. To simplify the description, it is assumed hereinafter that the action evaluation model of the present invention is installed on the wearable device (e.g., the smart wristband) via the SDK as an example for illustration. However, as described previously, the action identification and evaluation of the action evaluation model AEM of the present invention may also be implemented on a cloud server of a provider or an apparatus (e.g., a smart phone, a tablet computer, a personal computer, a wearable device or the like) at the user side. The action evaluation model AEM may be implemented by a computer program, which is executed by a processor of the wearable device to evaluate the actions.

As shown in FIG. 4, when a student is doing sport, the motion sensor of the smart wristband generates a to-be-evaluated data UED (i.e., raw data) in response to a sport action of the student. Thereafter, a to-be-evaluated action feature vector UEFV is generated after the to-be-evaluated data UED is computed via the feature vector creation model FVM. Next, a to-be-evaluated action classification vector UECV is generated after the to-be-evaluated action feature vector UEFV is computed via the classifier model CM.

After the to-be-evaluated action classification vector UECV is generated, an action and score level identification module IM may determine which one among the components A1, A2, A3, B1, B2, B3, C1, C2, C3, D1, D2, D3, E1, E2, E3, F1, F2 and F3 of the to-be-evaluated action classification vector UECV has the largest component value so as to identify the action and score level. For example, if the component B1 of the to-be-evaluated action classification vector UECV has the largest component value, then the action and score level identification module IM generates an identification result IR which indicates that the action corresponding to the to-be-evaluated data UED is the action B and that the score level of the action is "good". On the other hand, after identifying the action B, the action and score level identification module IM transmits an action identifier AID of the action B to a score computation module SM.

The score computation module SM performs an inner product operation on the representation action feature vector of the action B and the to-be-evaluated action feature vector UEFV according to the action identifier AID to generate a score value SV. In other words, the score computation module SM calculates a projection amount of the to-be-evaluated action feature vector UEFV onto the representation action feature vector, and takes a percentage of the projection amount to the representation action feature vector as the score value IR. In this way, the smart wristband may display the identification result IR and the score value SV on a screen thereof for reference of the student. The smart wristband may also transmit the identification result IR and the score value SV to the smart phone, the tablet computer, the personal computer or the cloud server connected with the smart wristband so as to record and store the identification result IR and the score value SV.

It shall be appreciated that, in this embodiment, the action evaluation model AEM comprises the action and score level identification module IM and the score computation module SM. However, in other embodiments, the action evaluation model AEM may not comprise the action and score level identification module IM and the score computation module SM. In this case, the action and score level identification module IM and the score computation module SM may be operated on the apparatus (e.g., the smart phone, the tablet computer, the personal computer or the cloud server) connected with the smart wristband. Accordingly, after the smart wristband transmits the to-be-evaluated action feature vector UEFV and the to-be-evaluated action classification vector UECV to the apparatus connected with the smart wristband, the apparatus can accordingly generate the identification result IR and the score value SV.

Moreover, the aforesaid exemplary examples take the sport action as the object of the action evaluation. However, as shall be appreciated by those of ordinary skill in the art, the action evaluation model AEM of the present invention may also be applied to action evaluation of other activities (e.g., mechanical operations or the like), so action evaluation of various activities all fall within the scope claimed in the present invention.

Figure 5:
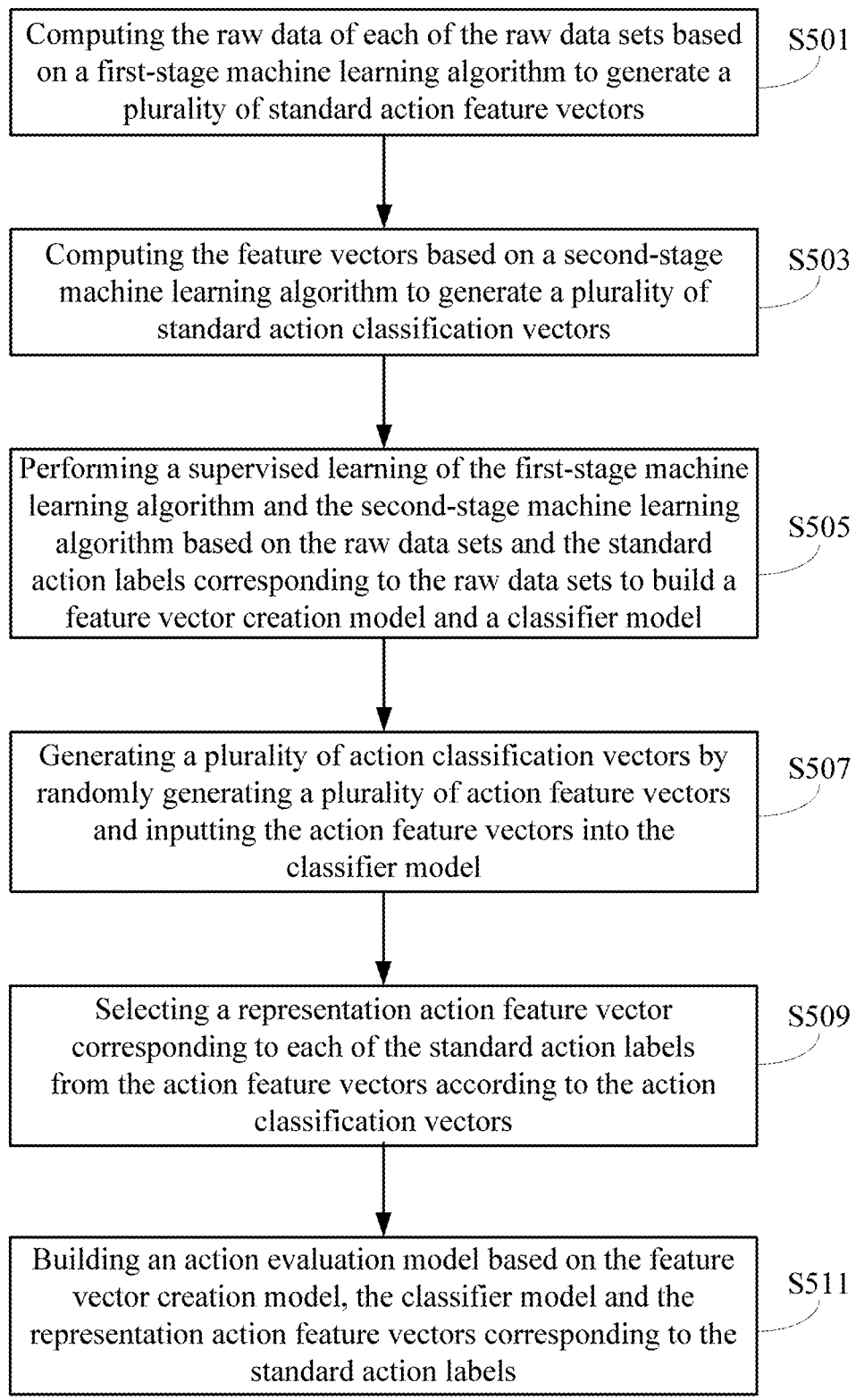
FIG. 5 is a flowchart diagram of an action evaluation model building method according to an embodiment of the present invention.

A third embodiment of the present invention is as shown in FIG. 5, which is a flowchart diagram of an action evaluation model building method according to the present invention. The action evaluation model building method is for use in an action evaluation model building apparatus (e.g., the action evaluation model building apparatus 1 of the first embodiment), and the action evaluation model building apparatus comprises a storage and a processor. The storage is configured to store a plurality of raw data sets and a plurality of standard action labels. Each of the raw data sets comprises a plurality of raw data, and each of the raw data is generated by a sensing device. Each of the raw data sets corresponds to one of the standard action labels.

The action evaluation model building method is executed by the processor. First, step S501 is executed to compute the raw data of each of the raw data sets based on a first-stage machine learning algorithm to generate a plurality of standard action feature vectors. Then, step S503 is executed to compute the standard action feature vectors based on a second-stage machine learning algorithm to generate a plurality of standard action classification vectors. Next, in step S505, a supervised learning of the first-stage machine learning algorithm and the second-stage machine learning algorithm is performed based on the raw data sets and the standard action labels corresponding to the raw data sets to build a feature vector creation model and a classifier model. The supervised learning makes the standard action classification vectors, each of which is generated by inputting the raw data of the raw data set corresponding to each of the standard action labels SAL into the feature vector creation model and the classifier model, have a specific component value.

Thereafter, in step S507, a plurality of action classification vectors are generated by randomly generating a plurality of action feature vectors and inputting the action feature vectors into the classifier model. In step S509, a representation action feature vector corresponding to each of the standard action labels is selected from the action feature vectors according to the action classification vectors. The action classification vector corresponding to each of the representation action feature vectors has a relative component maximal value. Finally, in step S511, an action evaluation model is built based on the feature vector creation model, the classifier model and the representation action feature vectors corresponding to the standard action labels.

In other embodiments, the first-stage machine learning algorithm comprises a Convolutional Neural Network (CNN) algorithm and a Long Short-Term Memory (LSTM) algorithm, and the second-stage machine learning algorithm is a Support Vector Machine (SVM) algorithm, a Neural Network (NN) algorithm, a Decision Tree (DT) algorithm, a Random Tree (RT) algorithm, a Boosting algorithm, a Bayes algorithm, an Expectation-Maximization (EM) algorithm or a K-Nearest Neighbors (KNN) algorithm.

Moreover, in other embodiments, each of the standard action classification vectors has a plurality of component values, and each of the component values is associated with one of the standard action labels and represents a score level. In an embodiment, the sensing device is mounted in a wearable device and comprises a motion sensor, and an inner product operation is performed on a to-be-evaluated action feature vector of a to-be-evaluated data generated by the sensing device and one of the representation action feature vectors to generate a score value, where the to-be-evaluated action feature vector is generated via the feature vector creation model of the action evaluation model.

Figure 6A:
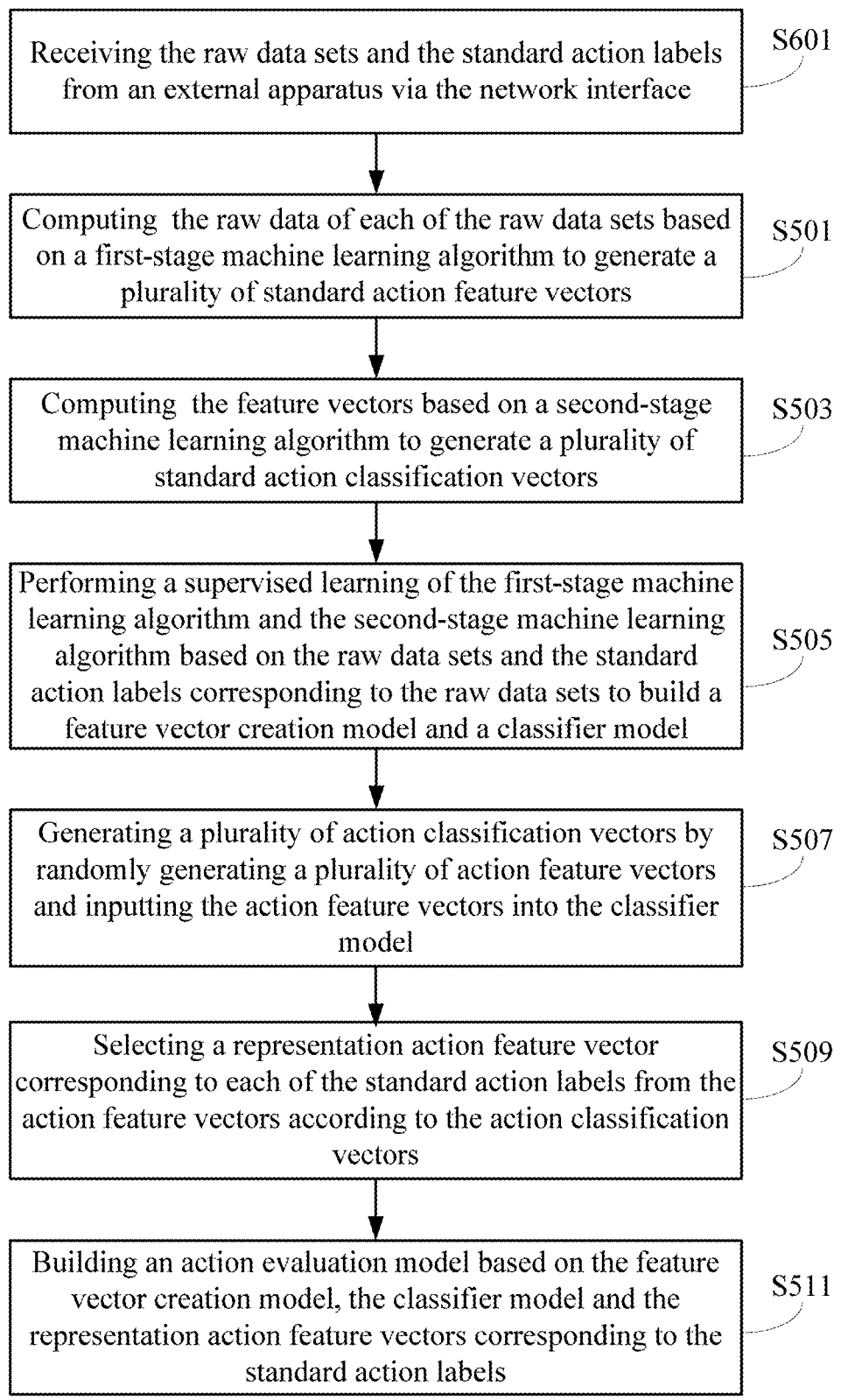
FIG. 6A is a flowchart diagram of an action evaluation model building method according to another embodiment of the present invention.
Figure 6B:
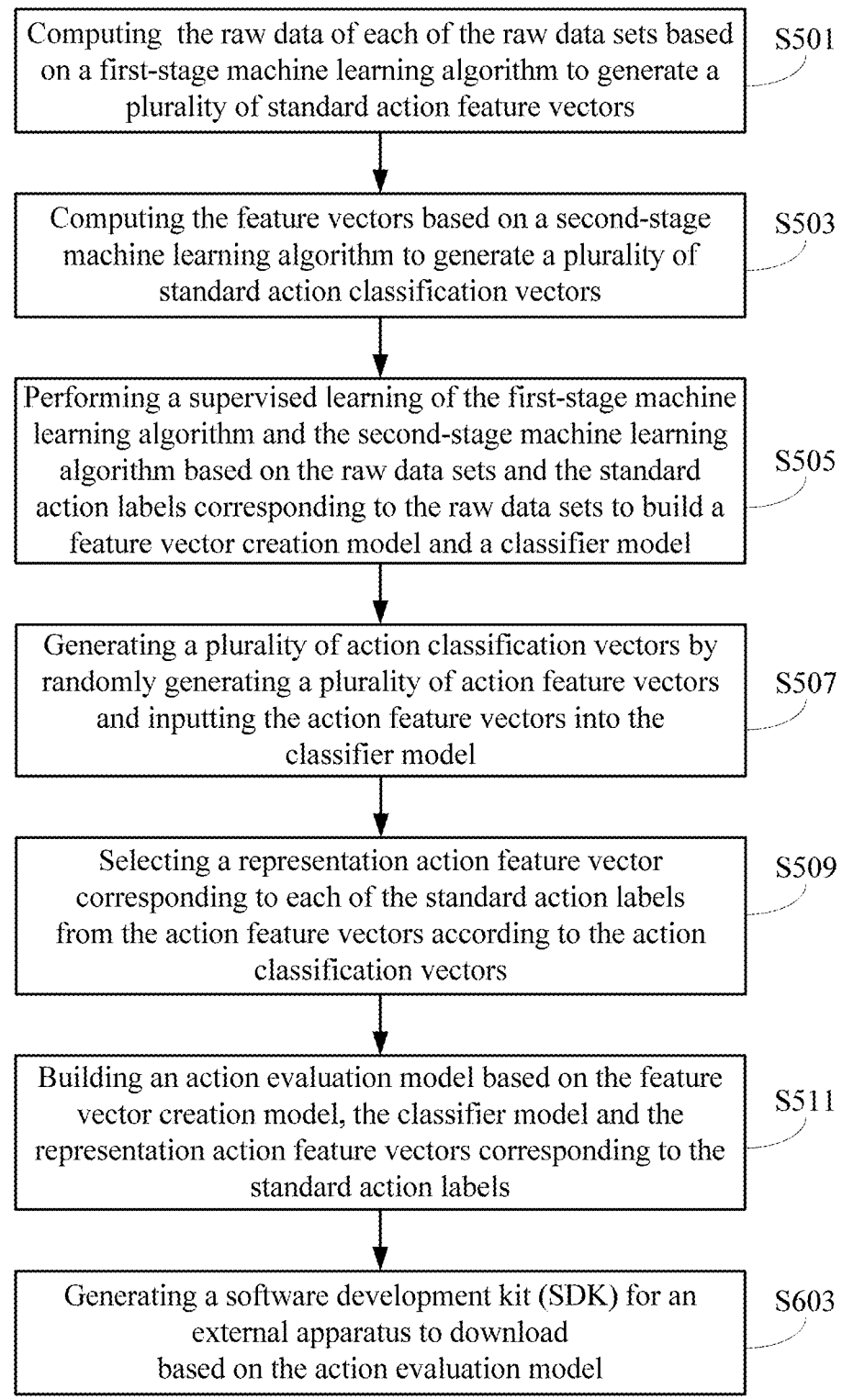
FIG. 6B is a flowchart diagram of an action evaluation model building method according to another embodiment of the present invention.

In other embodiments, the action evaluation model building apparatus may be a cloud server which further comprises a network interface connecting to a network. In this case, as shown in FIG. 6A, the action evaluation model building method of the present invention further comprises step S601: receiving the raw data sets and the standard action labels from an external apparatus via the network interface. Moreover, in other embodiments, as shown in FIG. 6B, the action evaluation model building method of the present invention further comprises step S603: generating a software development kit (SDK) for an external apparatus to download based on the action evaluation model.

According to the above descriptions, the action evaluation model for use in the wearable device according to the present invention is built by the supervised learning and based on the machine learning algorithms. The action evaluation model of the present invention can effectively provide the functions of action classification and action evaluation at the same time, thereby increasing applications of the wearable device and providing multivariate information.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An action evaluation model building apparatus, comprising:
   a storage, being configured to store a plurality of raw data sets and a plurality of standard action labels, each of the raw data sets comprising a plurality of raw data, each of the raw data being generated by a sensing device, and each of the raw data sets corresponding to one of the standard action labels; and
   a processor electrically connected to the storage, being configured to execute the following operations:
      computing the raw data of each of the raw data sets based on a first-stage machine learning algorithm to generate a plurality of standard action feature vectors;
      computing the standard action feature vectors based on a second-stage machine learning algorithm to generate a plurality of standard action classification vectors;
      performing a supervised learning of the first-stage machine learning algorithm and the second-stage machine learning algorithm based on the raw data sets and the standard action labels corresponding to the raw data sets to build a feature vector creation model and a classifier model, wherein the supervised learning makes the standard action classification vectors, each of which is generated by inputting the raw data of the raw data set corresponding to each of the standard action labels into the feature vector creation model and the classifier model, have a specific component value;
      generating a plurality of action classification vectors by randomly generating a plurality of action feature vectors and inputting the action feature vectors into the classifier model;
      selecting a representation action feature vector corresponding to each of the standard action labels from the action feature vectors according to the action classification vectors, the action classification vector corresponding to each of the representation action feature vectors having a relative component maximal value; and
      building an action evaluation model based on the feature vector creation model, the classifier model and the representation action feature vectors corresponding to the standard action labels.

2. The action evaluation model building apparatus of claim 1, wherein the first-stage machine learning algorithm comprises a Convolutional Neural Network (CNN) algorithm and a Long Short-Term Memory (LSTM) algorithm.

3. The action evaluation model building apparatus of claim 1, wherein the second-stage machine learning algorithm is one of a Support Vector Machine (SVM) algorithm, a Neural Network (NN) algorithm, a Decision Tree (DT) algorithm, a Random Tree (RT) algorithm, a Boosting algorithm, a Bayes algorithm, an Expectation-Maximization (EM) algorithm or a K-Nearest Neighbors (KNN) algorithm.

4. The action evaluation model building apparatus of claim 1, wherein each of the standard action classification vectors has a plurality of component values, and each of the component values is associated with one of the standard action labels and represents a score level.

5. The action evaluation model building apparatus of claim 4, wherein an inner product operation is performed on a to-be-evaluated action feature vector of a to-be-evaluated data generated by the sensing device and one of the representation action feature vectors to generate a score value, and the to-be-evaluated action feature vector is generated via the feature vector creation model of the action evaluation model.

6. The action evaluation model building apparatus of claim 1, further comprising a network interface connecting to a network and configured to receive the raw data sets and the standard action labels from an external apparatus.

7. The action evaluation model building apparatus of claim 1, wherein the sensing device is mounted in a wearable device and comprises a motion sensor.

8. The action evaluation model building apparatus of claim 1, further comprising a network interface connecting to a network, wherein the processor generates a software development kit (SDK) for an external apparatus to download based on the action evaluation model.

9. An action evaluation model building method for an action evaluation model building apparatus, the action evaluation model building apparatus comprising a storage and a processor, the storage being configured to store a plurality of raw data sets and a plurality of standard action labels, each of the raw data sets comprising a plurality of raw data, each of the raw data being generated by a sensing device, and each of the raw data sets corresponding to one of the standard action labels, the action evaluation model building method being executed by the processor and comprising the following steps:
   computing the raw data of each of the raw data sets based on a first-stage machine learning algorithm to generate a plurality of standard action feature vectors;
   computing the standard action feature vectors based on a second-stage machine learning algorithm to generate a plurality of standard action classification vectors;
   performing a supervised learning of the first-stage machine learning algorithm and the second-stage machine learning algorithm based on the raw data sets and the standard action labels corresponding to the raw data sets to build a feature vector creation model and a classifier model, wherein the supervised learning makes the standard action classification vectors, each of which is generated by inputting the raw data of the raw data set corresponding to each of the standard action labels into the feature vector creation model and the classifier model, have a specific component value;
   generating a plurality of action classification vectors by randomly generating a plurality of action feature vectors and inputting the action feature vectors into the classifier model;
   selecting a representation action feature vector corresponding to each of the standard action labels from the action feature vectors according to the action classification vectors, the action classification vector corresponding to each of the representation action feature vectors having a relative component maximal value; and
   building an action evaluation model based on the feature vector creation model, the classifier model and the representation action feature vectors corresponding to the standard action labels.

10. The action evaluation model building method of claim 9, wherein the first-stage machine learning algorithm comprises a Convolutional Neural Network (CNN) algorithm and a Long Short-Term Memory (LSTM) algorithm.

11. The action evaluation model building method of claim 9, wherein the second-stage machine learning algorithm is one of a Support Vector Machine (SVM) algorithm, a Neural Network (NN) algorithm, a Decision Tree (DT) algorithm, a Random Tree (RT) algorithm, a Boosting algorithm, a Bayes algorithm, an Expectation-Maximization (EM) algorithm or a K-Nearest Neighbors (KNN) algorithm.

12. The action evaluation model building method of claim 9, wherein each of the standard action classification vectors has a plurality of component values, and each of the component values is associated with one of the standard action labels and represents a score level.

13. The action evaluation model building method of claim 12, wherein an inner product operation is performed on a to-be-evaluated action feature vector of a to-be-evaluated data generated by the sensing device and one of the representation action feature vectors to generate a score value, and the to-be-evaluated action feature vector is generated via the feature vector creation model of the action evaluation model.

14. The action evaluation model building method of claim 9, wherein the action evaluation model building apparatus further comprises a network interface connecting to a network, and the action evaluation model building method further comprising the following step:
   receiving the raw data sets and the standard action labels from an external apparatus via the network interface.

15. The action evaluation model building method of claim 9, wherein the sensing device is mounted in a wearable device and comprises a motion sensor.

16. The action evaluation model building method of claim 9, wherein the action evaluation model building apparatus further comprises a network interface connecting to a network, and the action evaluation model building method further comprises the following step:
   generating a software development kit (SDK) for an external apparatus to download based on the action evaluation model.

* * * * *